(12) United States Patent
Bennett

(10) Patent No.: US 7,948,977 B2
(45) Date of Patent: May 24, 2011

(54) PACKET ROUTING WITH PAYLOAD ANALYSIS, ENCAPSULATION AND SERVICE MODULE VECTORING

(75) Inventor: James D. Bennett, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 554 days.

(21) Appl. No.: 11/429,477

(22) Filed: May 5, 2006

(65) Prior Publication Data
US 2007/0258449 A1 Nov. 8, 2007

(51) Int. Cl.
H04L 12/28 (2006.01)
(52) U.S. Cl. ........................................................ 370/389
(58) Field of Classification Search .................. 370/389, 370/400, 352, 355, 395.52
See application file for complete search history.

(56) References Cited

U.S. PATENT DOCUMENTS

| | | | |
|---|---|---|---|
| 5,608,720 A * | 3/1997 | Biegel et al. .................. 370/249 |
| 6,195,698 B1 | 2/2001 | Lillibridge | |
| 6,393,568 B1 | 5/2002 | Ranger | |
| 6,466,591 B1 * | 10/2002 | See et al. ....................... 370/535 |
| 6,512,769 B1 * | 1/2003 | Chui et al. ................ 370/395.41 |
| 6,678,272 B1 * | 1/2004 | Tzeng ............................ 370/392 |
| 2002/0007453 A1 | 1/2002 | Nemovicher | |
| 2002/0029260 A1 * | 3/2002 | Dobbins et al. ............... 709/219 |
| 2002/0032880 A1 | 3/2002 | Poletto et al. | |
| 2002/0069370 A1 | 6/2002 | Mack | |
| 2002/0087885 A1 | 7/2002 | Peled | |
| 2002/0129140 A1 | 9/2002 | Peled | |
| 2002/0129237 A1 | 9/2002 | Radatti | |
| 2003/0172262 A1 | 9/2003 | Curry | |
| 2005/0050221 A1 * | 3/2005 | Tasman et al. ................ 709/232 |
| 2005/0050338 A1 | 3/2005 | Liang | |

(Continued)

FOREIGN PATENT DOCUMENTS
EP 1063833 A 12/2000
(Continued)

OTHER PUBLICATIONS

Maya Gokhale et al; "Granidt: Towards Gigabit Rate network Intrusion Detection Technology"; FPL 2002, Montpellier,France.

(Continued)

*Primary Examiner* — Man Phan
*Assistant Examiner* — Nourali Mansoury
(74) *Attorney, Agent, or Firm* — Garlick Harrison & Markison; Bruce E. Garlick

(57) ABSTRACT

An Internet infrastructure with network devices and end point devices containing service module manager and service modules, that supports packet analysis, encapsulation and vectoring, and interleaving applications. The network device that supports packet content analysis on arriving packet, consists of a plurality of packet switched interface circuitries, user interface circuitry, local storage comprising the service module manager software and a plurality of local service modules, and processing circuitry communicatively coupled to each of the packet switched interfaces, local storage and user interface circuit. The processing circuitry executes service module manager and thus analyzes the packet content and applies one or more selected local service module processing using the packet. The processing circuitry thus takes one or more actions on the packet. A packet switching exchange that supports packet content analysis, encapsulation and vectoring on arriving packet, consisting a plurality of interconnecting switches, a plurality of line cards, general primary processing card. A client device that supports packet content analysis on arriving packet containing a plurality of network interfaces, user interface circuitry, local storage and processing circuitry communicatively coupled to each of the network interfaces, local storage and user interface circuitry.

23 Claims, 12 Drawing Sheets

U.S. PATENT DOCUMENTS

| | | |
|---|---|---|
| 2005/0050362 A1 | 3/2005 | Peles |
| 2005/0210533 A1 | 9/2005 | Copeland |
| 2005/0232262 A1* | 10/2005 | Toumura ............... 370/389 |
| 2005/0238005 A1 | 10/2005 | Chen |
| 2005/0251486 A1 | 11/2005 | Nair |
| 2005/0278784 A1 | 12/2005 | Gupta |
| 2006/0072582 A1 | 4/2006 | Bronnimann |
| 2006/0075494 A1 | 4/2006 | Bertman |
| 2006/0085528 A1 | 4/2006 | Thomas |
| 2006/0092921 A1* | 5/2006 | Narayanan et al. ........ 370/352 |
| 2006/0095971 A1 | 5/2006 | Costea |
| 2006/0174345 A1 | 8/2006 | Flanagan |
| 2006/0248575 A1 | 11/2006 | Levow |
| 2006/0251067 A1* | 11/2006 | DeSanti et al. .......... 370/389 |
| 2007/0179706 A1* | 8/2007 | McCutchen et al. ....... 701/201 |

FOREIGN PATENT DOCUMENTS

| | | |
|---|---|---|
| EP | 1335559 A | 8/2003 |
| EP | 1560398 A2 | 1/2005 |
| EP | 1699204 A | 9/2006 |
| KR | 2004 0102907 A1 | 12/2004 |
| WO | WO 97/12321 A | 4/1997 |
| WO | WO 0219639 A | 3/2002 |
| WO | WO 2004/091158 A | 10/2004 |
| WO | WO 2005/017708 A | 2/2005 |

OTHER PUBLICATIONS

Dharmapurikar S. et al; "Deep Packet Inspection Using Parallel Bloom Filters"; IEEE MICRO, IEEE Service Center Los Alamitos, CA,US Jan. 2004.

Steve White, et al; "Anatomy of a Commercial-Grade Immune System"; Internet Citation, Jun. 1999 (XP-002310183).

Young H. Cho, et al; "A Pattern Matching Co-processor for Network Security"; DAC 05; Proceedings of the 42nd Annual Conf. on Design Automation Jun. 13, 2005.

Shanmugasundaram Kulesh et al; "Payload Attribution via Hierarchical Bloom Filters"; Proc ACM Conf Computer Commun Secur; Proceedings of the ACM Conf on Computer & Comm. 2004 (XP002453251).

CISCO; "Committed Access Rate"; Internet Citation 1999 (XP-002375164).

CISCO ISP Essentials; Internet Citation Jun. 6, 2001 (XP-002217477).

David Whyte, et al; "DNS-Based Detection of Scanning Worms in an Enterprise Network";Security Symposium, Feb. 4, 2005 (XP-002412148).

* cited by examiner

Service Module Manager 600

- Trigger Logic 601 | Ref_IDs 602
- Service Logic 603
- Header Trig Templates 621 | Ref_IDs 622 | Field IDs 623 | Comparison Templates 624 | Operator 625 | TL_Ref 626
- Payload Trig Temp's 651 | Ref_IDs 652 | Comparison Templates 653 | Operator 654 | TL_Ref 655
- Header Supp'l Templates 671 | Ref_IDs 672 | Field IDs 673 | Comparison Templates 674 | Operator 675
- Payload Supp'l Temp's 685 | Ref_IDs 686 | Comparison Templates 687 | Operator 688

FIG. 6A

| Service Module Manager 600 | | | | | |
|---|---|---|---|---|---|
| Trigger Logic 601 | TL_1 604 | {{ If (NOT HS_2) then Local_SM_8 else Remote_SM_2 }} 605 | | | |
| | TL_2 606 | {{ If (HS_1 AND PS_1) then Remote_SM_6 }} 607 | | | |
| | TL_3 608 | {{ Copy_Remote_SM_2 }} 609 | | | |
| | TL_4 611 | {{ If (PS_2) then Copy_Remote_SM_2 }} 612 | | | |
| Header Trigger Templates 621 | HT_1 628 | Destinat'n 629 | 1st Target's IP Address 630 | Equals 631 | TL_1 632 |
| | HT_2 634 | Source 635 | 1st Target's IP Address 636 | Equals 637 | TL_1 638 |
| | HT_3 640 | Source 641 | 1st Network CIDR Address 642 | Not 643 | TL_2 644 |
| Payload Trig Temp's 651 | PT_1 656 | << 1st Bit Sequence(s) / Signature >> 657 | | Equals 658 | TL_3 659 |
| | PT_2 660 | << 2nd Bit Sequence(s) / Signature >> 661 | | Equals 662 | TL_4 663 |
| Header Suppl Templ's 671 | HS_1 676 | Destination 677 | 2nd Network CIDR Address 678 | Equals 679 | |
| | HS_2 680 | QoS 681 | Target QoS Word 682 | Greater 683 | |
| Payload Sup Temp's 685 | PS_1 689 | << 3rd Bit Sequence(s) / Signature >> 690 | | Equals 691 | |
| | PS_2 692 | << 4th Bit Sequence(s) / Signature >> 693 | | Not 694 | |

FIG. 6B

PACKET ROUTING WITH PAYLOAD ANALYSIS, ENCAPSULATION AND SERVICE MODULE VECTORING

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

1. Field of the Invention

This invention generally relates to communication infrastructures, and, more particularly, to switching node operations in a packet switched communication network.

2. Related Art

Internet has rapidly become widespread among population because of its ability to traffic audio, video, data packets at increased speeds. Internet infrastructure typically includes network devices such as routers, switches, packet switched exchanges, access points and Internet service provider's networks (ISPN), Internet communication pathways and end point devices. The end point devices include personal or laptop computers, servers, set top boxes, handheld data/communication devices and other client devices, for example. All these end point devices residing in remote locations exchange audio, video and data packets use any available Internet communication pathway.

Various remote and local services relating to communicated data are available to conventional end-point devices. Typically, an end-point device analyzes received data to determine if such services are warranted. Before performing such analysis on packetized, received data, the end-point device first reconstructs the packets (desegments) and stores the reconstructed data locally. If analysis of the reconstructed data so indicates, the end-point device will deliver the reconstructed data to the local or remote service—a process that often requires resegmentation and retransmission (for a remote service). This process often results in wasted communication, local storage, local processing and routing infrastructure resources. Moreover, even if the end-point device should perform such analysis and delivery, it need not do so to thwart a highly desired service. This applies to both source and destination end-point devices, which may be, for example, client devices and servers.

Typically, the exchange of audio, video and data packets via the Internet happens without any internal control over the packets, other than the network devices routing the packets from a source end point device to one or more destination end point devices. In other words, typical packet flow in an Internet infrastructure is unrestrained. Though such free flow of packets is usually beneficial, some packets, inadvertently or deliberately, may contain disruptive content (e.g., virus, worms or other malware), unauthorized content (e.g., pirated copies of video, audio, text or program code), unwanted content (e.g., pornography or adult themes), or unsuitable content (e.g., content unlikely to benefit a particular region because of customs, regional constraints, or language limitations).

Conventional end point devices have the burden of restraining presentation or execution of such disruptive, unauthorized, unwanted, and unsuitable content. Often, however, such end point device is incapable of doing so. For example, even with malware protection software active, end point devices are often infected. With blocking software installed, pornography is still displayed to children. Other types of filters blocking such types of content also fail with undesirable results.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the Claims.

In accordance with the present invention, an Internet infrastructure with network devices and end point devices containing service module manager and service modules, that supports packet analysis, encapsulation and vectoring, and interleaving applications. The network device that supports packet content analysis on arriving packet, consists of a plurality of packet switched interface circuitries, user interface circuitry, local storage comprising the service module manager software and a plurality of local service modules, and processing circuitry communicatively coupled to each of the packet switched interfaces, local storage and user interface circuit. The processing circuitry executes service module manager and thus analyzes the packet content and applies one or more selected local service module processing using the packet. Further, the processing circuitry, by applying selected local service module processing using the packet, takes one or more actions on the packet. The execution of service module manager includes comparison of packet content with trigger templates available with the service module manager and executing appropriate trigger logic. The trigger logic directs the processing circuitry to apply one or more selected local service module processing using the packet.

In accordance with present invention, a packet switching exchange that supports packet content analysis, encapsulation and vectoring on arriving packet, consisting a plurality of interconnecting switches, a plurality of line cards, general primary processing card. The line cards contain network interfaces, switch interface and secondary processing circuitry consisting secondary service module manager and a plurality of secondary service modules. The general primary processing card consists of core primary processing circuitry containing local primary service module manager software and a plurality of local primary service modules. The secondary processing circuitry, by executing the secondary service module manager, takes a first set of actions on the packet. Similarly, the primary processing circuitry, by executing the primary service module manager if indicted, takes a second set of actions on the packet, by applying one or more selected local primary service module processing using the packet.

In accordance with present invention, a client device that supports packet content analysis on arriving packet containing a plurality of network interfaces, user interface circuitry, local storage and processing circuitry communicatively coupled to each of the network interfaces, local storage and user interface circuitry. The storage further consists of service module manager software and a plurality of local service modules.

Features and advantages of the present invention will become apparent from the following detailed description of the invention made with reference to the accompanying drawings.

BRIEF DESCRIPTION OF THE DRAWINGS

FIG. 6A is a schematic diagram illustrating an embodiment of trigger logic, header templates and payload templates incorporated into service module managers (SMM) of FIGS. 2 and 4;

FIG. 6B is another schematic diagram illustrating an example of trigger logic, header templates and payload templates of FIG. 6A;

DETAILED DESCRIPTION OF THE INVENTION

Figure 1:
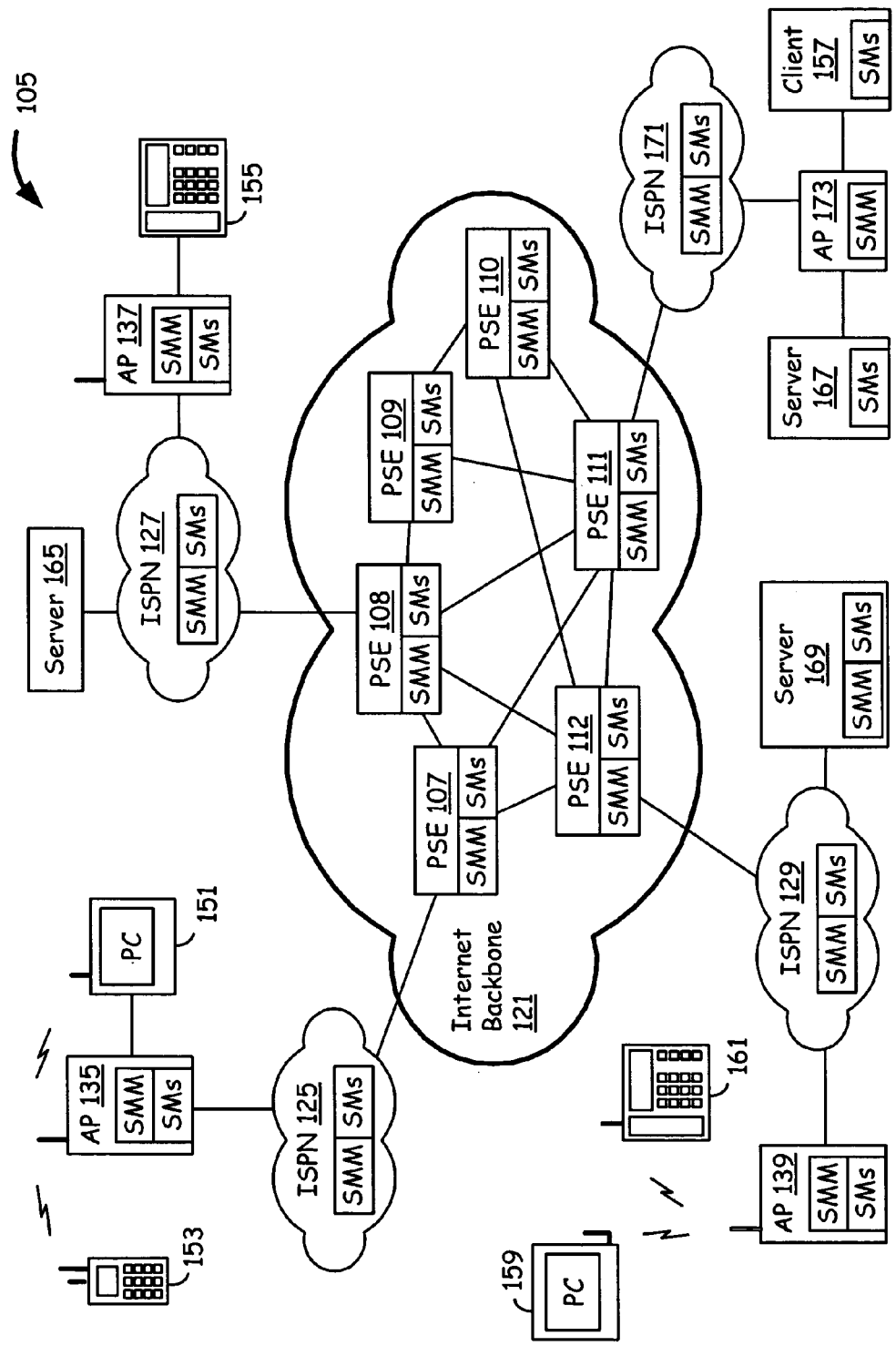
FIG. 1 is a schematic block diagram of an Internet infrastructure with network devices and end point devices containing service module manager and service modules, that supports packet analysis, encapsulation and vectoring, and interleaving applications.

FIG. 1 is a schematic block diagram of an Internet infrastructure 105 with network devices and end point devices containing service module manager and service modules, that supports packet analysis, encapsulation and vectoring, and interleaving applications. The internet infrastructure 105 typically consists of an Internet backbone 121, which routes packets from a source end point device to a destination end point device. The Internet backbone 121 includes packet switching exchanges (PSEs) 107 through 112, which process the packet content for destination address and forward the packet accordingly to a next PSE or to Internet service provider's network (ISPN) 125, 127, 129 or 171. The packets from ISPN 125, 127, 129 or 171 are further routed to the destination end point devices 151, 153, 155, 157, 159 or 161, via access points (APs) 135, 137, 139 or 173. Further, any of the end point devices 151, 153, 155, 157, 159, or 161 may also be the source devices from which packets originate. A typical Internet infrastructure 105 also contain servers 165, 167 or 169 attached to the ISPNs 125, 127, 129 or 171, from which the packets may either originate or conclude.

In accordance with the present invention, each of the PSEs 107 through 112, ISPNs 125, 127, 129 and 171, APs 135, 137, 139 and 173 and some of the servers 165, 167 and 169, in various capacities, incorporate service module managers (SMMs) and service modules (SMs). Some of the end point devices 151, 153, 155, 157, 159 and 161 may also incorporate SMs. Some legacy and incompatible routing and switching devices (PSEs, ISPNs, APs, end point devices or servers) may not incorporate the SMMs and/or SMs. The SMMs in the routing and switching devices of Internet infrastructure 105 analyze the packets and apply one or more of SM processing, before forwarding to a next device. The SMMs contain various trigger templates such as header trigger templates and payload trigger templates, and further contain trigger logic. In general, the trigger templates may vary depending on the form of the packet. Typical IPv6 (Internet Protocol version 6) Internet packet form consists of headers, extension headers, and payload among other fields. Accordingly, the trigger templates may consist of header, extension header and payload trigger templates.

During the analysis of the packets, the SMMs compare the packet contents with the trigger templates and if a full or partial match occurs, execute the trigger logic associated with the match. Then, the SMMs apply one or more SM processing as indicated in the trigger logic. Choice of a particular SM processing for a given packet depends on the trigger logic and indications in the template. The SMMs may also apply SM processing on a packet, in any of the devices containing SMMs and SMs, if independent request is indicated in the packet. If the SMs indicated in the trigger logic is not available within the device, external SMs may be employed by interrupting the packet routing and sending a copy of the packet to another device, which may contain the required SM. Embodiments of the trigger logic, header templates and payload templates contained in SMMs, as applicable to an Internet packet, is described with reference to the FIGS. 6A, 6B and 7.

A typical PSE, router, switch, ISPN, AP, server, or end point devices, according the present invention, consists of a processing circuitry, network interfaces, and local storage among other blocks. Such embodiments of circuitries are described with reference to the FIGS. 2, 3, 4 and 5. The memory contains one or more of service module managers (SMMs) and local service modules (local SMs). If partial or full match occurs while comparing with any one of the trigger templates, the trigger logic indicates one or more of the SM processing to be applied on the packet. If appropriate local SMs are not available, external SMs available in other network devices may be utilized. The processing circuitry, at the instance of a packet arrival, executes the SMM based on the comparison with the trigger templates, and by running appropriate trigger logic, applies one or more SM processing using the packet.

By applying the SM processing, the processing circuitry may take one of the several options available in the SMs, such as interrupting the route forwarding process and returning the packet to the sender. Alternatively, if no match occurs, the processing circuitry may simply perform route processing and forward the packet to a next network device. On the other hand, the processing circuitry may perform route processing, forward the packet to a next network device, also make a copy of the packet, and forward it to another SMM for further analysis.

A simple packet analysis performed by the processing circuitry, for example, by executing SMM using an incoming vectored packet is to compare the header information of an IPv6 packet against trigger lists. If match found, the processing circuitry examines the trigger logic and reconciles multiple matches or multiple trigger logic, if any. If there is no need for any further analysis, such as in case of time sensitive VoIP audio and/or video packets, the processing circuitry performs route processing and forwards the packet. If time sensitivity is not a particular factor, then, the processing circuitry performs full or partial payload correlation. Here, the processing circuitry attempts to correlate payload and signature templates. If again no match found, the packet is route processed and forwarded. If in any one of the template comparisons the processing circuitry finds partial or full match, then the packet is vectored to local and/or remote service modules.

For example, the client device 157 may attempt to download a file from the server 165. The packets (that is, the file to be downloaded) could typically take the pathway of ISPN 127, PSE 108, PSE 111, ISPN 171, AP 173 and finally to the client 157. The packets (from the file to be downloaded) may contain additional independent requests to the SMMs of ISPN 127 (or, PSEs 108 or 111) to apply certain SM processing. For example, if the client device 157, attached to ISPN 171, is from certain region, or certain organization, or for some specific purpose, discard the packets (or send it back to the server 165), or apply some other specific SM processing. This case may occur if the file to be downloaded is not meant for that particular region because of regional customs, any other regional constraints, or language problems. On the other hand, the file requested by the client 157 may not be appropriate for that particular organization.

Then, the SMM that first appears in the communication pathway (in this case SMM of ISPN 127) compares the packet content against the trigger templates and runs trigger logic to find any match. Then, the SMM handles independent requests that appear with the packets, which may be inserted into the extension headers or payload portion of the packets in case of IPv6, for example. According to the independent requests, the SMM applies specifically requested SM processing. If specifically requested SMs are not available locally with the ISPN 127, the SMM may interrupt the flow of the packets, encapsulate it with requests to apply specific SM processing and send it to another server (that is, because on non-availability of local SMs, the ISPN 127 utilizes external SMs). Alternatively, the SMM may not interrupt the flow of the packets, but simultaneously make a copy and apply SM processing on the copy for future use. For example, the ISPN 127 may send the encapsulated packets to the server 169 for applying specific SMs. Such packets when arrived back at the ISPN 127, they are again encapsulated without any further requests for application of SM processing and may be routed to the client 157 without any further processing. While sending the packet to the ISPN 169, the ISPN 127 may or may not make a copy of the packets, this is determined by the trigger logic. Alternatively, the ISPN 127 may discard packets or send packets back to the server 165, if indicated in the SM processing at the ISPN 127 or the server 169. If the ISPN 127 does not incorporate SMMs and SMs, the above-mentioned process may be handled by SMMs of the PSE 108 or 111.

In addition, the packets originating from the server 165, inadvertently or deliberately, may contain concealed disruptive codes such as virus, worms or Trojan horse. Here, the trigger templates in the SMM of the ISPN 127 contain various signature templates that identify the disruptive codes. When a match occurs, these packets discarded at the ISPN 127, while applying the SM processing. Alternatively, if the server 165 belongs to an organization, for example, the packets originating from the server 165 may contain restricted material. The signature templates in the SMM of the ISPN 127, in this case, contain words or phrases that identify the restricted material. When a match occurs, appropriately, the SMM runs trigger logic. The trigger logic is typically conditional codes that apply specific SM processing depending upon the match occurred while comparing the packets against trigger templates. The trigger logic identifies the action to be taken, and guides the processing circuitry to apply appropriate SM processing. When a restricted word or phrase is identified, for example, the SM processing application may send the packets back to the server 165, or may send packets to another location such as the personal computer 151, for further human verification. Again, if the ISPN 127 does not incorporate SMMs and SMs, the above-mentioned process may be handled by SMMs of the PSE 108 or 111.

Further, besides the switching and routing equipment having the components of the present invention, the servers and the client devices may also have some of the components, such as the SMMs and/or SMs. For example, server 169 may have both SMM and SMs and may preprocess the packets, as mentioned above, before sending them to the ISPN 129. Some other server 167, for example, may have only SMM and may utilize the external SMs for completion of the packet processing, according to the present invention. Similarly, some client devices, such as 157, may have SMs that are specifically tailored to the requirements of the client device.

Figure 2:
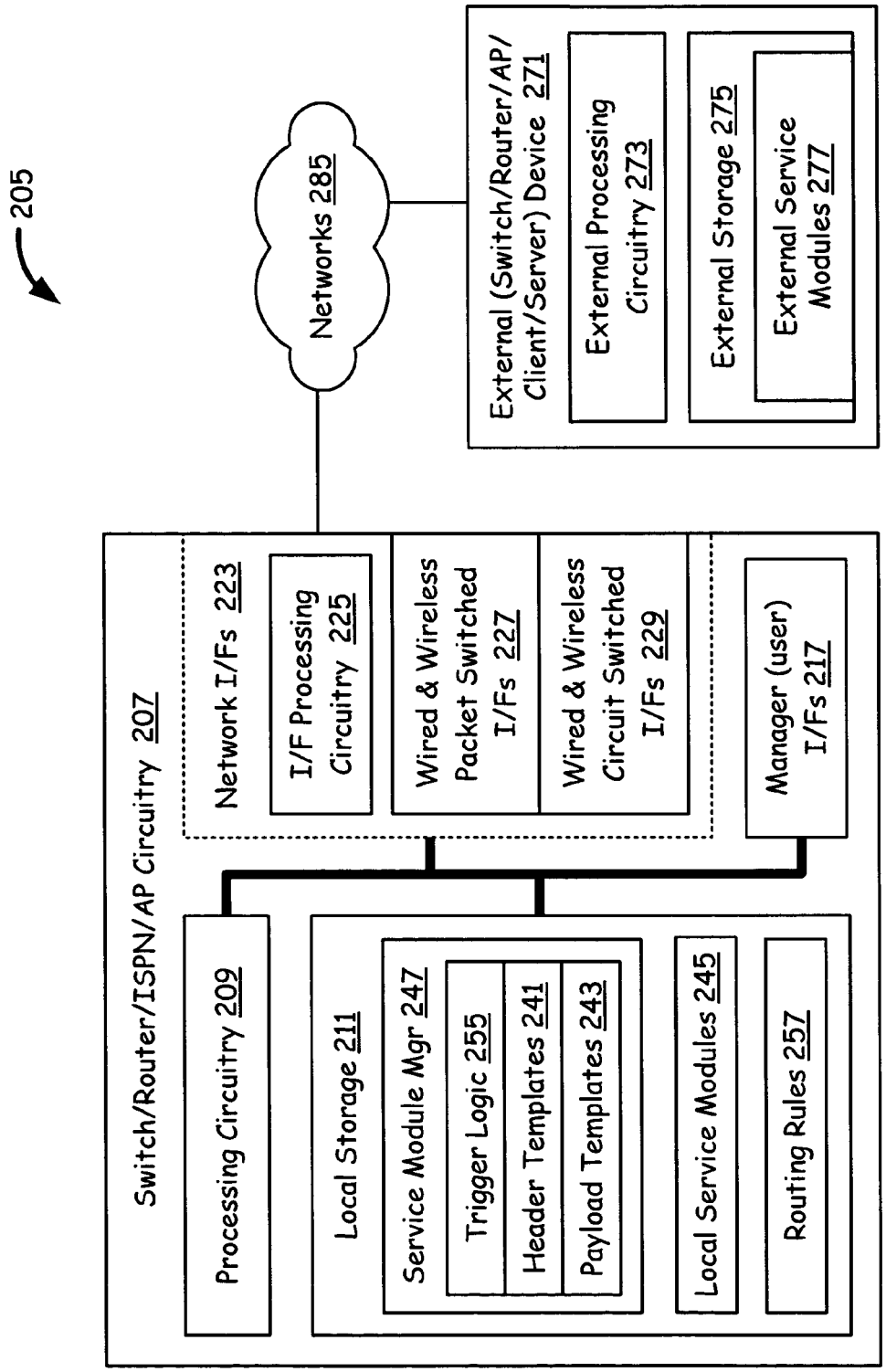
FIG. 2 is a schematic block diagram illustrating network device (switch/router/ISPN/AP) constructed in accordance with the embodiments of FIG. 1 of the present invention.

FIG. 2 is a schematic block diagram 205 illustrating network device 207 (switch/router/ISPN/AP) constructed in accordance with the embodiments of FIG. 1 of the present invention. The network device circuitry 207 may be any of device circuitry that route data packets and the circuitry may in part or full be incorporated in any of the network devices described with reference to the FIG. 1. In specific, network device circuitry 207 may be refer to any of the PSEs 107 through 112, ISPNs 125, 127, 129 and 171, APs 135, 137, 139 and 173, some of the servers 165, 167 and 169 or any other node equipment (not shown). The network device circuitry 207 generally includes processing circuitry 209, local storage 211, manager interfaces 217 and network interfaces 223. These components communicatively coupled to one another via one or more of a system bus, dedicated communication pathways, or other direct or indirect communication pathways. The processing circuitry 209 may be, in various embodiments, a microprocessor, a digital signal processor, a state machine, an application specific integrated circuit, a field programming gate array, or other processing circuitry.

Local storage 211 may be random access memory, read-only memory, flash memory, a disk drive, an optical drive, or another type of memory that is operable to store computer instructions and data. The local storage includes SMM (Service Module Manager) 247 and Local SMs 245 (Service Modules) described in this invention. The SMM 247 further contains trigger logic 255, header and payload templates 241 and 243 respectively. The header templates 241 and payload templates 243, which in general may be content templates, in other embodiments may differ to reflect the form of the packets. The local storage 211 also contains routing rules 257, which regulate the flow of the packets.

Further, the network interfaces 223 contain wired and wireless packet switched interfaces 227, wired and wireless circuit switched interfaces 229 and further the network interfaces 223 may also contain built-in or an independent interface processing circuitry 225. The network interfaces 223 allow network devices to communicate with other network devices and allow processing circuitry to utilize external SMs of other network devices, when such SMs are not available in the local storage. The manager interfaces 217 may include a display and keypad interfaces. These manager interfaces allow the user at the network exchanges to control aspects of the trigger templates, the trigger logic and the service modules.

In other embodiments, the network device 207 of the present invention may include fewer or more components than are illustrated as well as lesser or further functionality, and may adapt to the data packets exchange functionality rather than voice packets exchange. In other words, the illustrated network device is meant to merely offer one example of possible functionality and construction in accordance with the present invention. Other possible embodiments of network devices are described with reference to the FIGS. 3 and 5, in terms of PSE and AP respectively.

The network device 207 is communicatively coupled to external network devices, such as device 271, via networks 285. The external network device 271 may also consist of elements of present invention such as external processing circuitry 273, external storage 275 and external service modules 277.

The SMM 247 that resides in the local storage also consists of content templates such as header and payload templates 241 and 243. The processing circuitry 209, while executing the SMM 247, compares the header content of the packet against the header templates 241 and similarly, compares the payload field of the packet with the payload templates 243. If a match is hit, then the SMM 247 executes the trigger logic 255 that are indicated with the match. These trigger logic 255 conditional statements direct the processing circuitry 209 to execute appropriate local SMs 245. If an appropriate local SM 245 is not available, external (remote) SMs are employed. For example, the packet may be encapsulated and forwarded to the external network device 271 with an independent request for this external SMs 277 to be executed. The external processing circuitry 273 then executes external SMs 277 and again encapsulates the packet sends it back to the network device 207. Alternatively, if indicated in the external SMs 277, the packets may be returned to the sender or may be discarded. Note that the trigger logic also contains programs necessary for analysis of packets. Detailed explanation of the functioning of trigger templates and the trigger logic that relates to the current illustration may be found in description with reference to the FIGS. 6A and 6B.

Figure 3:
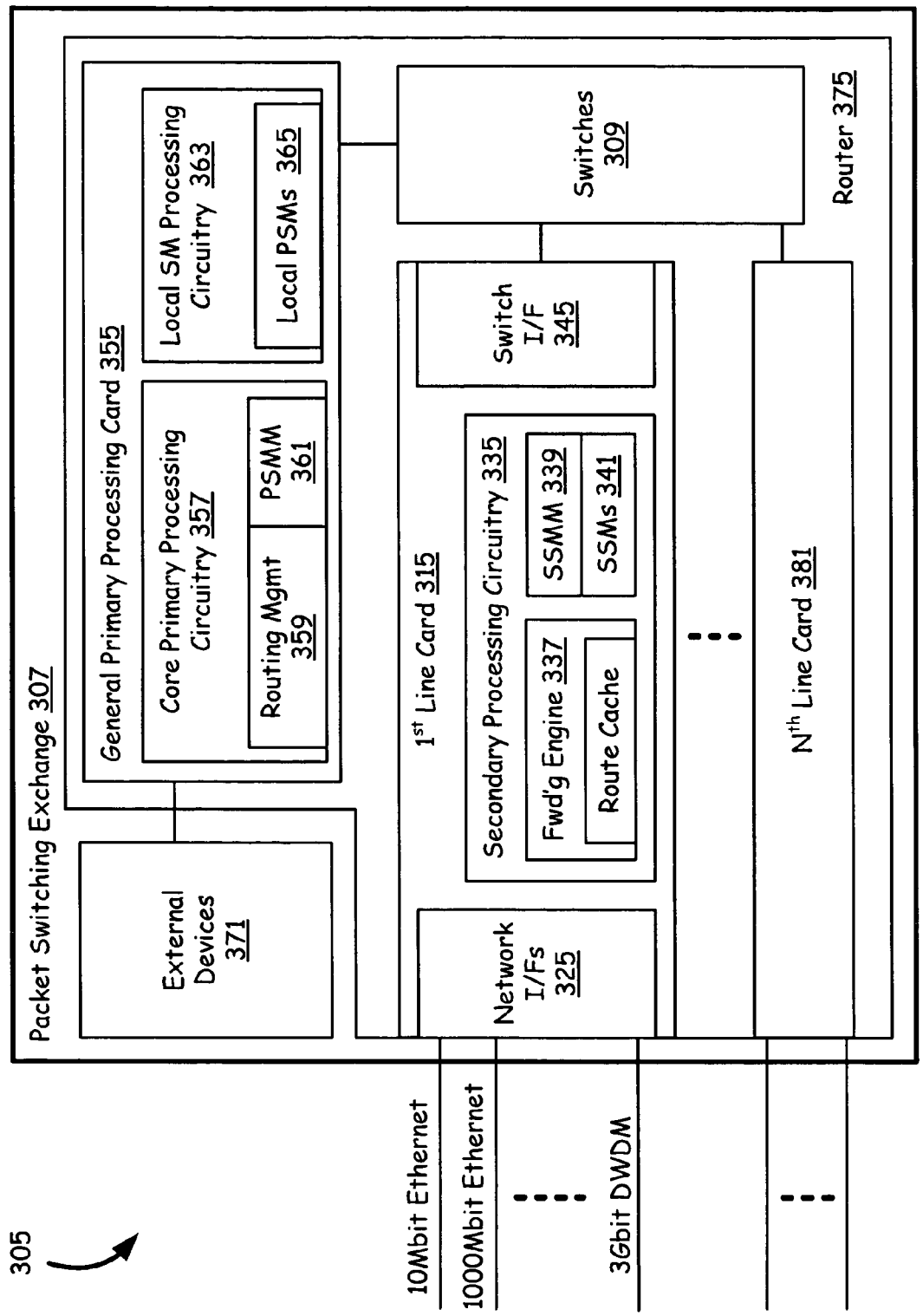
FIG. 3 is a schematic block diagram illustrating a packet switching exchange constructed in accordance with the embodiments of FIG. 1 of the present invention.

FIG. 3 is a schematic block diagram 305 illustrating a packet switching exchange 307 constructed in accordance with the embodiments of FIG. 1 of the present invention. The packet switching exchange circuitry 307 may refer to any of the PSEs 107 through 112 described with reference to the FIG. 1. The PSE circuitry 307 generally includes a router 375 comprising general primary processing card 355, switches 309 and plurality line cards 315 and 381. Further, the PSE 307 may also contain external devices 371, such as storage units or user interfaces (not shown). The line cards 315 and 381 may all be different in certain cases.

The first line card 315 consists of network interfaces 325 capable of interfacing with wired and wireless networks such as 10 Mbit, 1000 Mbit Ethernet networks and 3 Gbit DWDM (Dense Wavelength Division Multiplexing) fiber optic networks. The first line card 315 also contains switch interfaces 345 that allow the card to interface with interconnecting switches 309. Further, the first line card 315 consists of secondary processing circuitry 335, which preprocesses the packets before interconnecting switches 309 route the packets. The secondary processing circuitry 335 contains forwarding engine 337 and secondary service module manager (SSMM) 339 and secondary service modules (SMs) 341.

The general primary processing card 355 further consists of core primary processing circuitry 357 and local service module processing circuitry 363. The core primary processing circuitry 357 further consists of routing management 359, which allows routing of packets and primary service module manager (PSMM) 361. Local SM processing circuitry 363 further contains local primary service modules (PSMs) 365. The separation of SMM and SMs into primary and secondary SMMs and SMs 339, 341, 361 and 365 help speed up the processing and routing of packets.

The SSMM 339 preprocesses the packet by comparing the packet content with trigger templates. If a match occurs that can be quickly resolved by applying SMM 341 processing, then such resolution is taken in the secondary processing circuitry 315 itself. Then, the packets may be forwarded to another PSE or ISPN. If further analysis is required, the packets are processed using PSMM 361 and local PSMs 365. Detailed explanation of the functioning of trigger templates and the trigger logic that relates to the PSE 307 may be found in description with reference to the FIG. 7. The functional details of the current circuitry, specifically, the SSMM 339, SMMs 341, PSMM 361, and local PSMs 365 can be found in description with reference to the flowchart in FIGS. 10 and 11.

Figure 4:
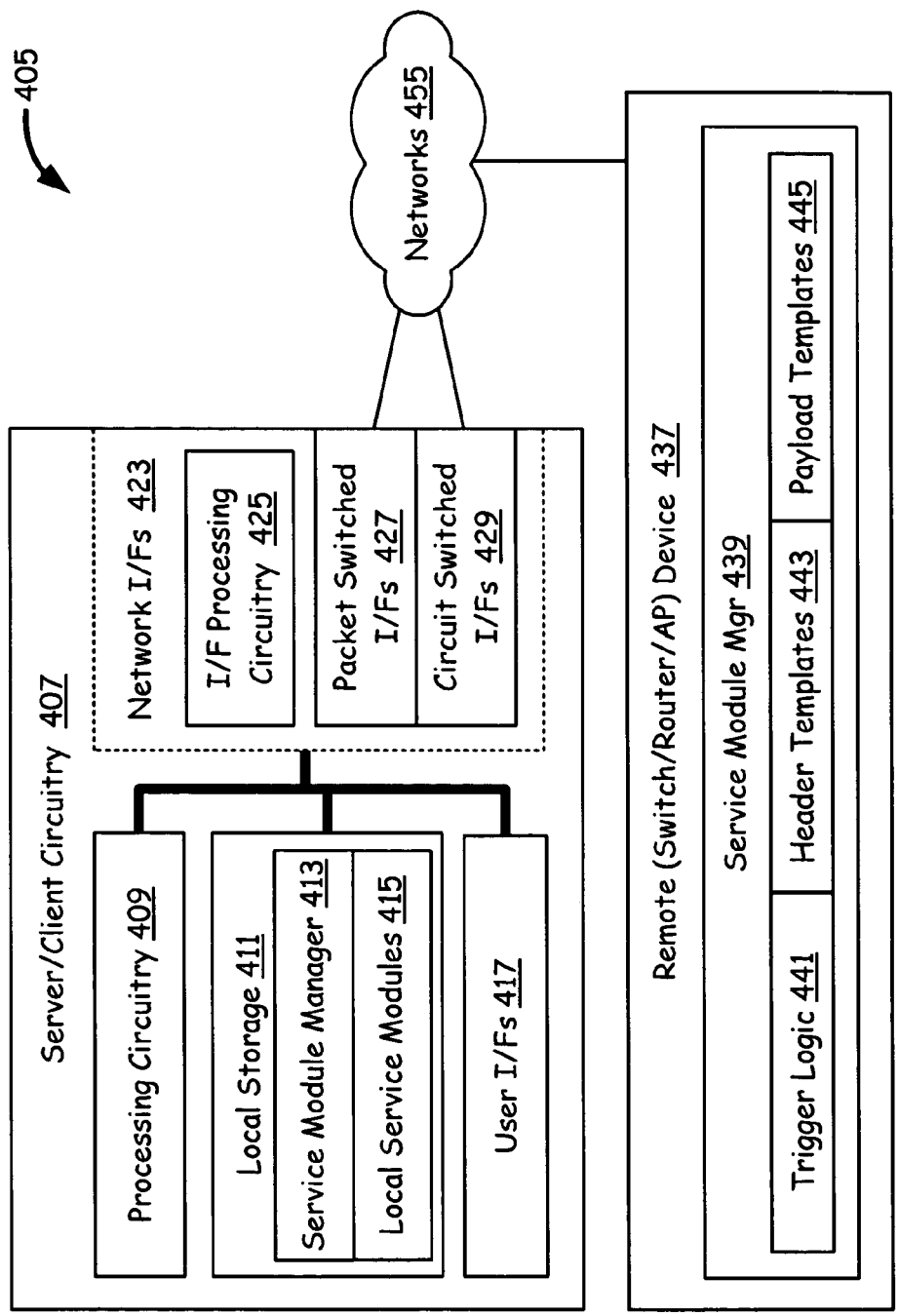
FIG. 4 is a schematic block diagram illustrating end point devices (servers and/or clients) constructed in accordance with the embodiments of FIG. 1 of the present invention.

FIG. 4 is a schematic block diagram 405 illustrating end point devices (servers and/or clients) 407 constructed in accordance with the embodiments of FIG. 1 of the present invention. The server/client circuitry 407 may refer to any of the device circuitry from which packets originate and/or terminate, and the circuitry may in part or full be incorporated in any of the end point devices described with reference to the FIG. 1. In specific, the server/client circuitry 407 may refer to any of the end point devices 151, 153, 155, 157, 159, or 161 described with reference to the FIG. 1.

The server/client circuitry 407 generally includes processing circuitry 409, local storage 411, user interfaces 417 and network interfaces 423. These components communicatively coupled to one another via one or more of a system bus, dedicated communication pathways, or other direct or indirect communication pathways. The processing circuitry 409 may be, in various embodiments, a microprocessor, a digital signal processor, a state machine, an application specific integrated circuit, a field programming gate array, or other processing circuitry.

Further, the network interfaces 423 may contain wired and wireless packet switched interfaces 427, wired and wireless circuit switched interfaces 429 and the network interfaces 423 may also contain built-in or an independent interface processing circuitry 425. The network interfaces 423 allow end point devices to communicate with other end point devices and allow processing circuitry to utilize external SMs of other network devices, when such SMs are not available in the local storage. The user interfaces 417 may include a display and keypad interfaces. The user interfaces 417 allow the user at the end point devices to control aspects of the trigger templates, the trigger logic, and the service modules among other usual user interaction with end point devices. The end point device 407 is communicatively coupled to external network devices, such as device 437, via networks 455. The external network device 437 may also consist of elements of present invention such as SMM 439. The SMM 439 may further consist of trigger logic 441, header templates 443 and payload templates 445.

Local storage 411 may be random access memory, read-only memory, flash memory, a disk drive, an optical drive, or another type of memory that is operable to store computer instructions and data. The local storage 411 includes SMM (Service Module Manager) 413 and Local SMs 415 (Service Modules) described in this invention, though the SMMs and SMs may exist in a simplified form. The SMM 413 may further contain trigger logic and content templates. In other embodiments, the network device 407 of the present invention may include fewer or more components than are illustrated as well as lesser or further functionality, and may adapt to the data packets exchange functionality rather than voice packets exchange. In other words, the illustrated end point device is meant to merely offer one example of possible functionality and construction in accordance with the present invention.

A server, for example, may employ the SMM 413 to compares the content of the packet against the content templates. If a match occurs, then the SMM 413 executes a trigger logic that is indicated with the match. The trigger logic conditional statements, in turn, direct the processing circuitry 409 to execute appropriate local SMs 415. If an appropriate local SM 415 is not available, external SMs may be employed. Note that the trigger logic may also contain programs necessary for analysis of packets. The SMM 413 incorporated in the client/server circuitry 407 allows prescreening of the packets before they enter the Internet network, where they might undergo further SM processing. The client circuitry may not have a SMM though, but may have several service modules that are accessible to external SMMs residing in servers or network devices when needed.

Figure 5:
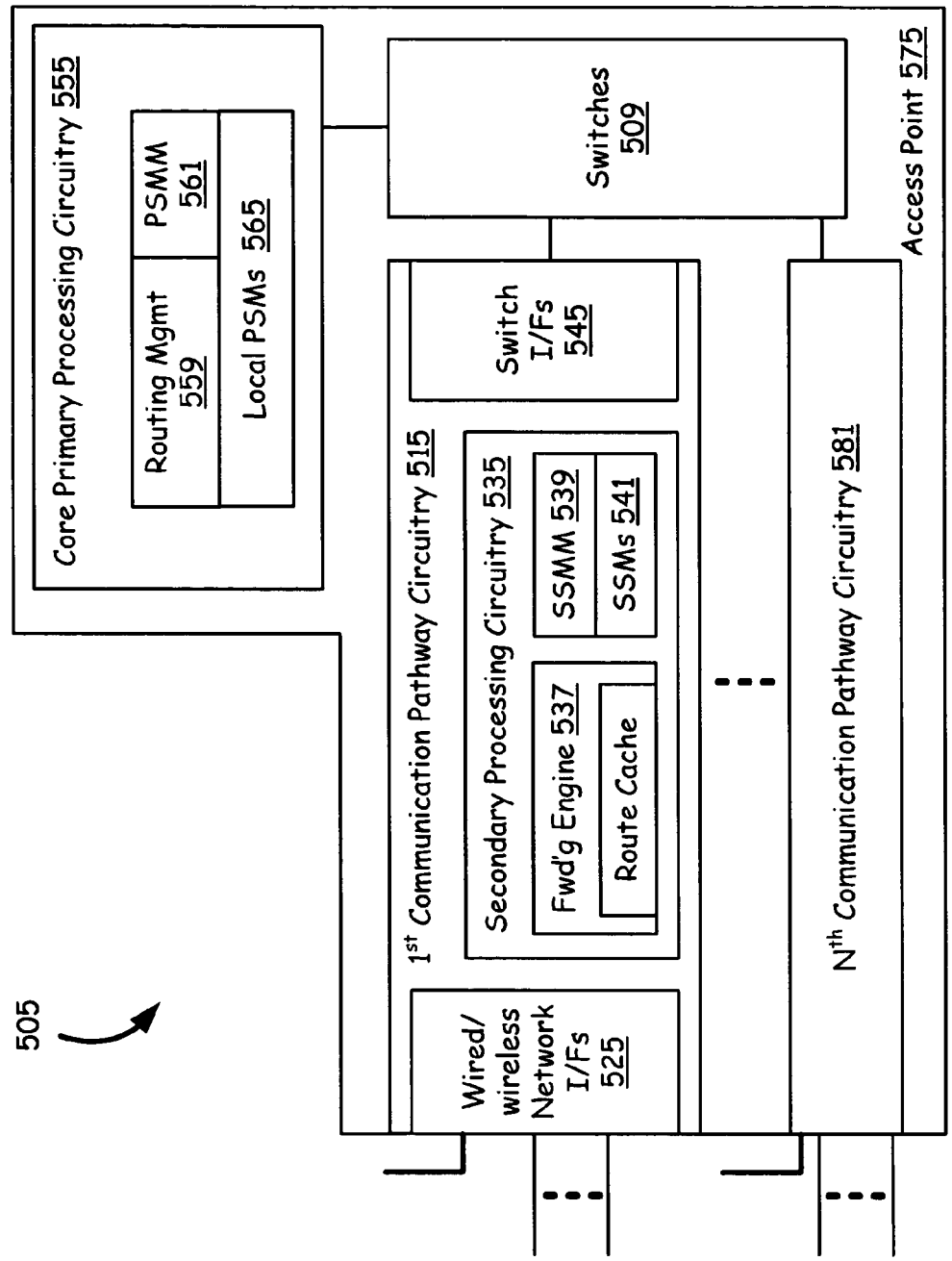
FIG. 5 is a schematic block diagram illustrating an access point constructed in accordance with the embodiments of FIG. 1 of the present invention.

FIG. 5 is a schematic block diagram 505 illustrating an access point 575 constructed in accordance with the embodiments of FIG. 1 of the present invention. The access point circuitry 575 may refer to any of the APs 135, 139, 137 or 173 described with reference to the FIG. 1. The AP circuitry 575 generally includes a plurality of communication pathway circuitries 515, 581, core primary processing circuitry 555 and switches 509. The communication pathway circuitries 515 to 581 may all be different in certain cases. The first communication pathway circuitry 515 consists of wired and/or wireless network interfaces 525 capable of interfacing with wired and wireless networks, switch interfaces 545 that allow the card to interface with interconnecting switches 509 and secondary processing circuitry 535. The secondary processing circuitry 535 preprocesses the packets before interconnecting switches 509 route the packets. The secondary processing circuitry 535 further contains forwarding engine 537 and secondary service module manager (SSMM) 539 and secondary service modules (SMs) 541. The core primary processing circuitry 555 further consists of routing management 559, which allows routing of packets, primary service module manager (PSMM) 561 and local primary SMs (local PSMs) 565. The separation of SMM and SMs into primary and secondary SMMs and SMs 539, 541, 561 and 565 help speed up the processing and routing of packets.

As described with reference to the FIG. 3, the SSMM 539 preprocesses the packet by comparing the packet content with trigger templates. If a match occurs that can be quickly resolved by applying SMM 541 processing, then such resolution is taken in the secondary processing circuitry 515 itself. Then, the packets may be forwarded to another network device. If further analysis is required, the packets are processed using PSMM 561 and local PSMs 565. Detailed explanation of the functioning of trigger templates and the trigger logic that relates to the AP 575 may be found in description with reference to the FIG. 7. The functional details of the current circuitry, specifically, the SSMM 539, SMMs 541, PSMM 561, and local PSMs 565 can be found in description with reference to the flowchart in FIGS. 10 and 11.

FIG. 6A is a schematic diagram illustrating an embodiment of trigger logic, header templates and payload templates incorporated into service module managers (SMM) 600 of FIGS. 2 and 4. In this embodiment, the SMM 600 consists of trigger logic 601, header trigger templates 621, header supplemental templates 671, payload trigger templates 651 and payload supplemental templates 685.

Trigger logic 601 consists of reference identifiers (IDs) field 602 and service logic 603. Header trigger templates 621 consists of Ref_IDs (reference IDs) 622, Field IDs 623, comparison templates 624, operator 625 and trigger logic reference IDs (TL_Ref IDs) 626. Similarly, header supplemental templates 671 contain reference IDs 672, field IDs 673, comparison templates 674 and operator 675. Further, the payload trigger templates 651 contain reference IDs 652, comparison templates 653, operator 654 and TL_Ref IDs 655. Similarly, the payload supplemental templates 685 contain reference IDs 686, comparison templates 687 and operator 688.

Ref_IDs 602 allow processing circuitry to identify each of the service logic 603 (conditional statements) among many available. Similarly, reference IDs 622, 652, 672 and 686 in the templates allow processing circuitry to identify a template among many available within each of the header trigger templates 621, header supplemental templates 671, payload trigger templates 651 and payload supplemental templates 685. The field IDs 623 and 673 in the header trigger templates 621 and header supplemental templates 671 allow processing circuitry to identity the fields in the header of the packet. For example, a typical IPv6 header and extension headers may contain source address, destination address and QoS (Quality of Service) fields, among other fields. The comparison templates 624, 653, 674 and 687 allow identify the keywords in payload or keywords in header that is to be compared. The operator 625, 654, 675 and 688 are comparative operators that tell processing circuitry how to compare field IDs that refer to a particular content of packets to the comparison templates, for example. For example, the operator 625, 654, 675 and 688 could be equals, not (not equals), greater (greater than) or lesser (lesser than). An example of trigger logic, header trigger templates, header supplemental templates, payload trigger templates and payload supplemental templates, the functioning of these, is described with reference to FIG. 6B.

FIG. 6B is another schematic diagram illustrating an example of trigger logic, header templates and payload templates of FIG. 6A. The SMM 600 of FIG. 6A consisted of trigger logic 601, header trigger templates 621 and 671, and payload trigger templates 651 and 685. In this illustration, few service logic and few templates are shown, though in reality, there could be many more of service logic and templates. Further, in reality, the trigger logic, header logic and payload logic may be different depending on the packet contents, that is, fields of the packets.

The trigger logic 601 consists of four service logics 605, 607, 609 and 612, referenced by TL_1 through TL_4 604, 606, 608 and 611 respectively. The header trigger templates 621 consists of three Ref_IDs, viz., HT_1 through HT_3 628, 634 and 640, three filed IDs 629, 635 and 641, three comparison templates 630, 636 and 642, three operator fields 631, 637 and 643, and three TL_Ref fields 632, 638 and 644. Similarly, header supplemental templates 671 contains two Ref_IDs, viz., HS_1 and HS_2 676 and 680, two field IDs 677 and 681, two comparison templates 678 and 682, and two operator fields 679 and 683. Further, payload trigger templates 651 contains two Ref_IDs, viz., PT_1 and PT_2 656 and 660, two comparison templates 657 and 661, two operator fields 658 and 662, and two TL_Ref fields 659 and 663. Similarly, payload supplemental templates 685 contains two Ref_IDs, viz., PS_1 and PS_2 689 and 692, two comparison templates 690 and 693, and two operator fields 691 and 694.

For example of functioning of the SMM 600 in this embodiment, consider a packet containing restricted material in the payload, but is all right in every other ways. The processing circuitry while executing the SMM 600, at first may verify if there are any matches in the header trigger templates 621. Since, in this example, header information is all right, no matches are found while comparing the packet header contents with each of the three templates referenced by 628, 634, and 640. Similarly, no matches are found while comparing packet header content with all three templates referenced by 676 and 680. Next, the processing circuitry verifies with payload trigger templates 651. While executing the template referenced by PT_1 656, $1^{st}$ bit sequences/signature 657 (a keyword that identifies restricted material, for example) is compared with packet payload content. The operator field 658 contains 'equals', that is, the $1^{st}$ bit sequences 657 is required to match the payload field contents of the packet. The bit sequences 657 may partially or fully be matched, for a trigger to occur. In this case, the $1^{st}$ bit sequences 657 may match partially with the payload contents and therefore a trigger occurs. Then SMM 600 directs the processing circuitry to the service logic TL_3, by referring to the TL_Ref field 659. The processing circuitry then executes TL_3 608 conditional statement or service logic 609. The conditional statement 609 is 'Copy_Remote_SM_2,' that is, copy the packet, and then execute an external service module SM_2. Therefore, the processing circuitry sends a copy of the packet to an external network device, server or end point device to have the SM_2 service module executed using the copy of the packet. The above example describes just one possible circumstance in which a trigger occurs, but there might be innumerable other circumstances where trigger may occur and a process similar to the ones mentioned above may happen.

Figure 7:
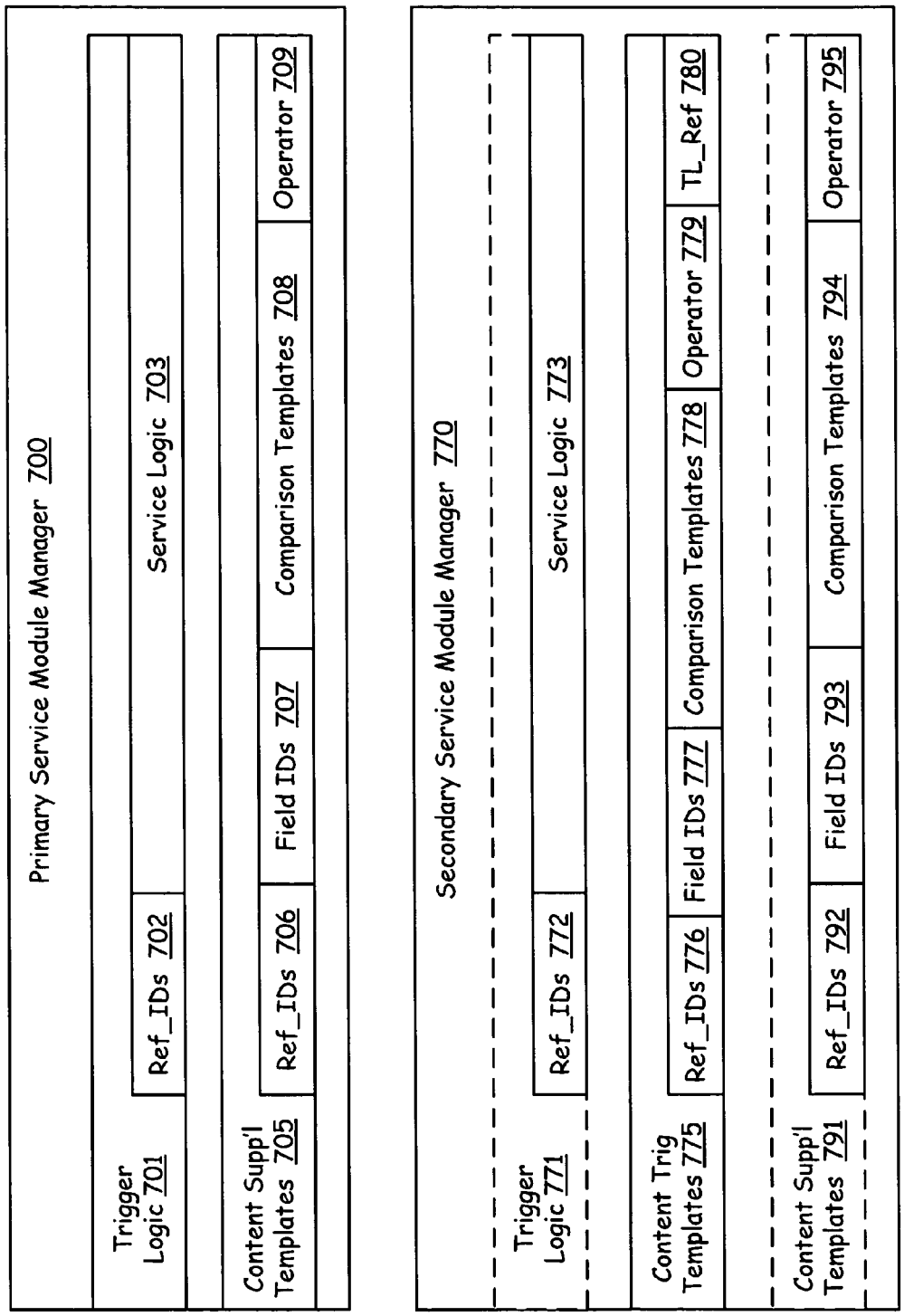
FIG. 7 is another schematic diagram illustrating an embodiment of trigger logic, content templates incorporated into primary and secondary service module managers (SMM) of FIGS. 3 and 5.

FIG. 7 is another schematic diagram illustrating an embodiment of trigger logic, content templates incorporated into primary and secondary service module managers (PSMM and SSMM) 700 and 770 of FIGS. 3 and 5. In this embodiment, the PSMM 700 consists of trigger logic 701 and content supplemental templates 705. Similarly, the SSMM 770 contains content trigger templates 775, and may optionally contain trigger logic 771 and content supplemental templates 791.

Trigger logic 701 consists of reference identifiers (IDs) field 702 and service logic 703. Content supplemental templates 705 consists of Ref_IDs 706, field IDs 707, comparison templates 708 and operator 709. Similarly, content trigger templates 775 contain Ref_IDs 776, field IDs 777, comparison templates 778, operator 779 and TL_Ref 780. Further, trigger logic 771 consists of reference identifiers (IDs) field 772 and service logic 773. Finally, content supplemental templates 791 contain reference IDs 692, field IDs 693, comparison templates 694 and operator 695. The description of FIGS. 6A and 6B are applicable here as well, in an analogous manner.

Figure 8:
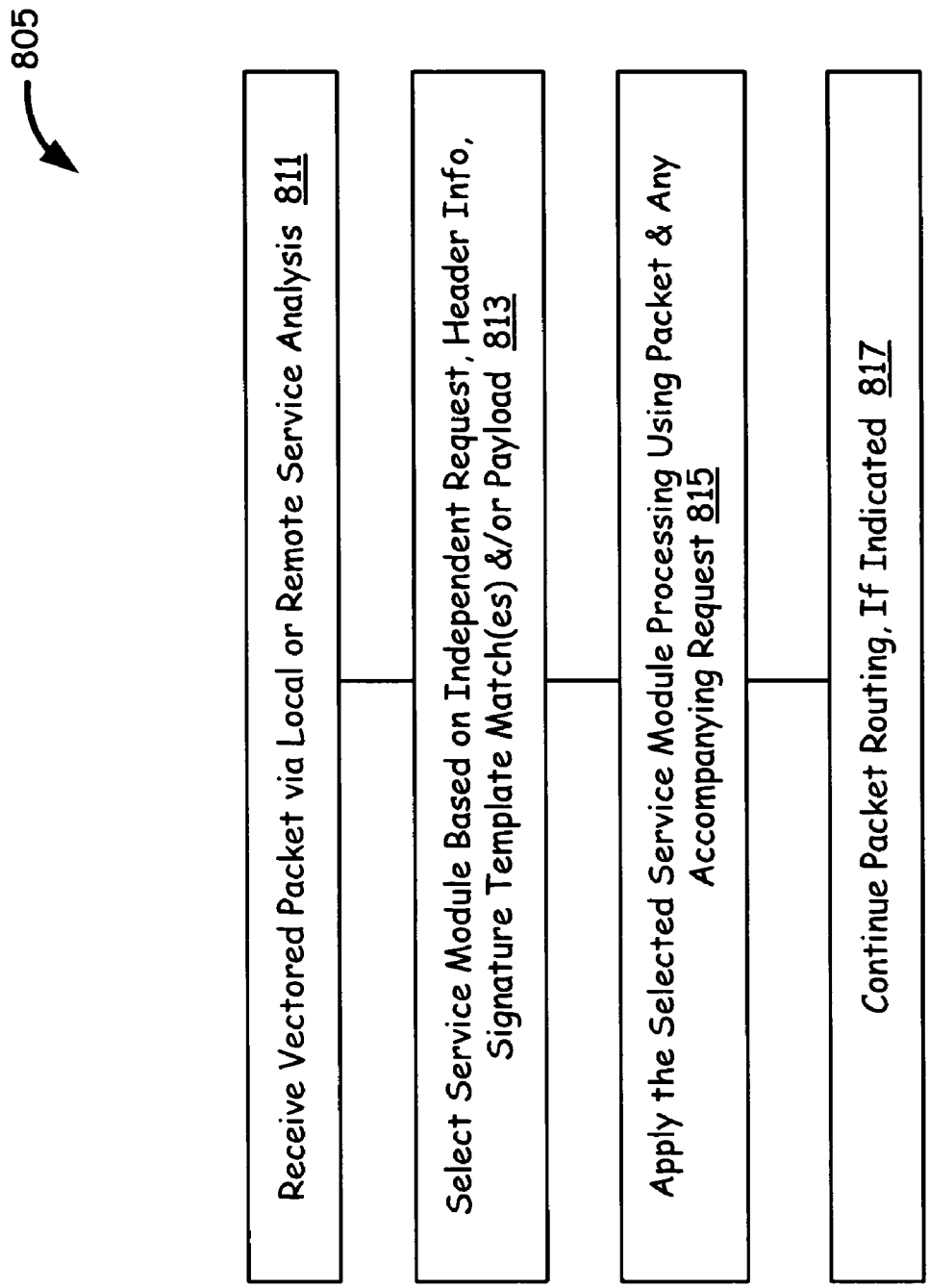
FIG. 8 is a flowchart illustrating general flow of functionality of service module managers of FIGS. 2 and 4.

FIG. 8 is a flowchart 805 illustrating general flow of functionality of service module managers (SMMs) of FIGS. 2 and 4. At block 811, the processing circuitry, while executing the SMM, receives vectored packet via local or remote service analysis. Then, using this incoming vectored packet, the processing circuitry compares the header information of the packet against header templates. Similarly, using the vectored packet, the processing circuitry compares the payload information of the packet against payload templates. Then at a next block 813, the processing circuitry executes a trigger logic based on the comparison. That is, the processing circuitry selects a SM, by executing trigger logic, based on independent request, header information, signature template matches or payload content matches. At a next block 815, the processing circuitry applies the selected SM processing using the packet and any accompanying request. Then, at a next block 817, the packet routing is continued if indicated.

Typically, the memory contains one or more of service module managers (SMMs) and a plurality of local service modules (local SMs). If partial or full match occurs while comparing incoming vectored packets with any one of the trigger templates, the trigger logic indicates one or more of the SM processing to be applied on the packet. If appropriate local SMs are not available, external SMs available in other network devices may be utilized. The processing circuitry, at the instance of a packet arrival, executes the SMM, based on the comparison with the trigger templates, and by running appropriate trigger logic, applies one or more SM processing using the packet. A more detailed description of this flow chart can be found in description with reference to the FIG. 9.

Figure 9:
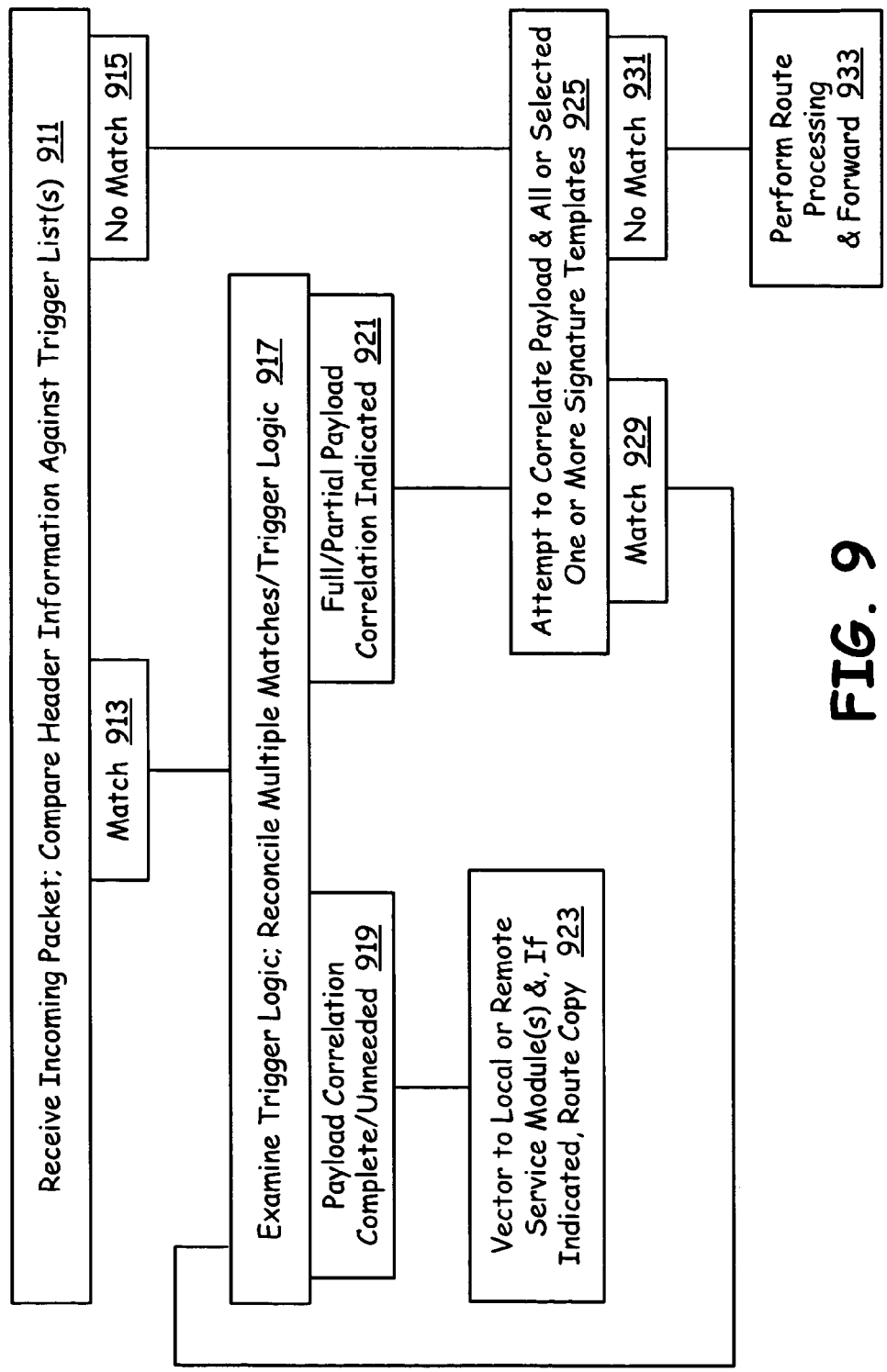
FIG. 9 is a flowchart illustrating detailed flow of events in a service module managers of FIGS. 2 and 4.

FIG. 9 is a flowchart illustrating a detailed flow 905 of events in a service module manager (SMM) of FIGS. 2 and 4. At a block 911, the processing circuitry receives incoming vectored packet and compares header information against the trigger lists. At a next block 913, match is found and at a next block 917, the processing circuitry examines the trigger logic and reconciles multiple matches or multiple trigger logic, if any. If multiple matches are found, multiple trigger logic may have to be executed and multiple SM processing needs to be applied. This may cause clash or repetition of SM applications. Therefore, a resolution should be taken regarding multiple matches. At a next block 919, if payload correlation is complete or not needed (that is, if there is no need to compare packet payload contents with payload templates), the processing circuitry vectors the packets to local or remote SMs and if indicated makes a route copy, at a next block 923. The situation of block 919 may occur if there is no need for any further analysis, such as in case of time sensitive VoIP audio and/or video packets, the processing circuitry performs route processing and forwards the packet.

If time sensitivity is not a particular factor, then, such an indication occurs at a next block 921 and the processing circuitry attempts to correlate payload with, all or selected one or more of signature templates, at a next block 925. If again no match found at a next block 931, the packet is route processed and forwarded, at a next block 933. If in any one of the template comparisons the processing circuitry finds partial or full match at a block 929, then the packet is reexamined at the block 917, and the above-mentioned processes are repeated. At block 915, if no header template matches are found, then the processing circuitry attempts to correlate payload with, all or selected one or more of signature templates, at the block 925.

Figure 10:
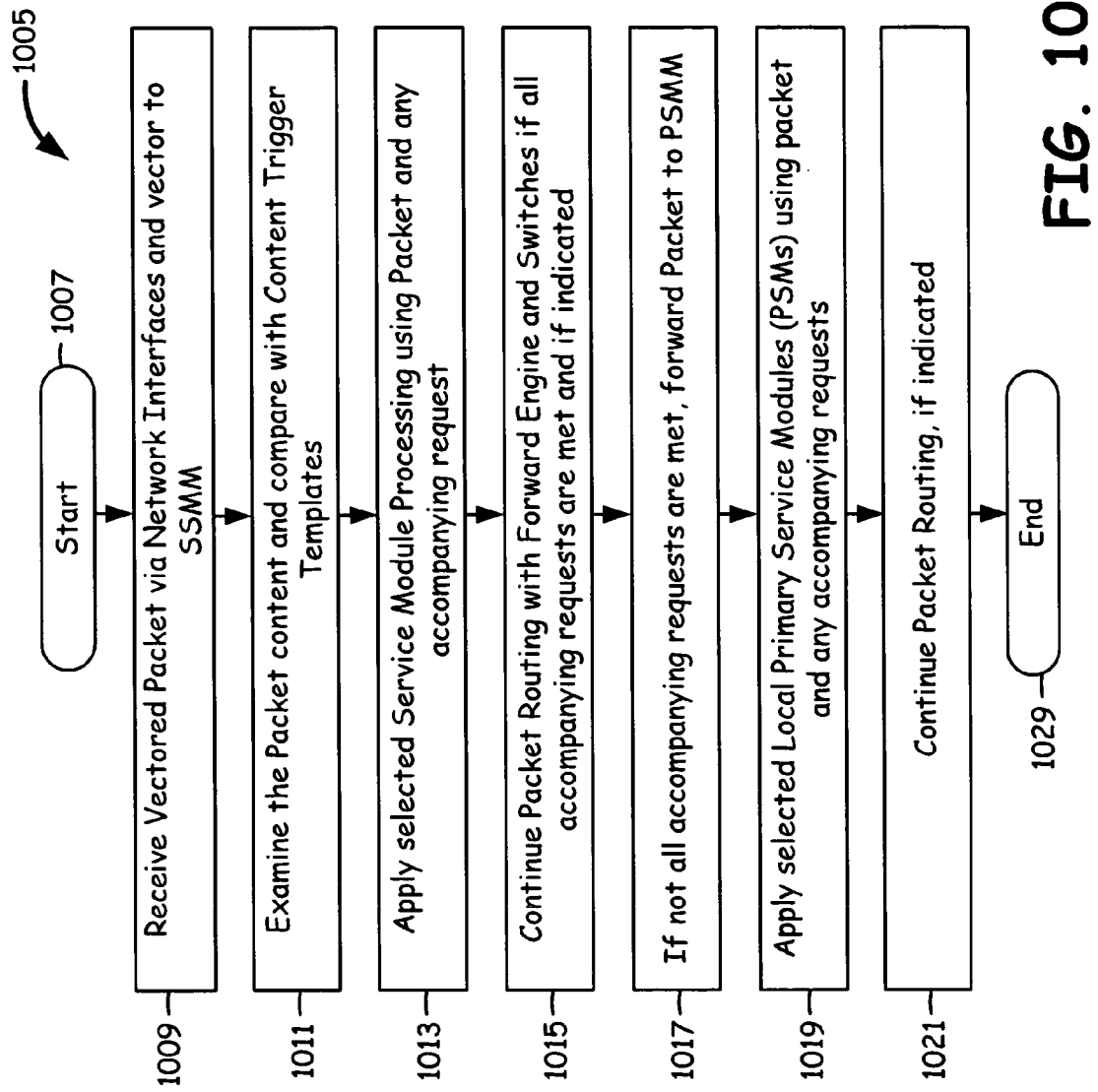
FIG. 10 is a flowchart illustrating general flow of functionality of service module managers (SSMM and PSMM) of FIGS. 3 and 5.

FIG. 10 is a flowchart 1005 illustrating general flow of functionality of service module managers (SSMM and PSMM) of FIGS. 3 and 5. The functionality of SSSM begins at a block 1007. At a next block 1009, the secondary processing circuitry receives vectored packet via network interfaces and vectors to SSMM. The secondary processing circuitry uses the packet and begins to execute the SSMM, i.e., compare with content trigger templates, at a next block 1011. In other words, the SSMM preprocesses the packet by comparing the packet content with content trigger templates. Then, at a next block 1013, selected secondary service module (SMM) processing is applied using the packet and any accompanying request. That is, if matches occur while comparing with content trigger templates, which can be quickly resolved by applying SMM processing, then such resolution is taken in the secondary processing circuitry itself. Then, at a next block 1015, packet routing is continued using forward engine and switches if all accompanying requests are met and if indicated in the SSMM.

At a next block 1017, if not all accompanying requests are met and if all matches are resolved in secondary processing circuitry at block 1015, the packet is forwarded to PSMM for further analysis. Then, at a next block 1019, selected local primary service module (PSM) or remote SM processing is applied using the packet and any accompanying requests. If indicated in PSMM, the primary processing circuitry continues with route processing and forwarding the packet, at a next block 1021. The method ends at a next block 1029.

Figure 11:
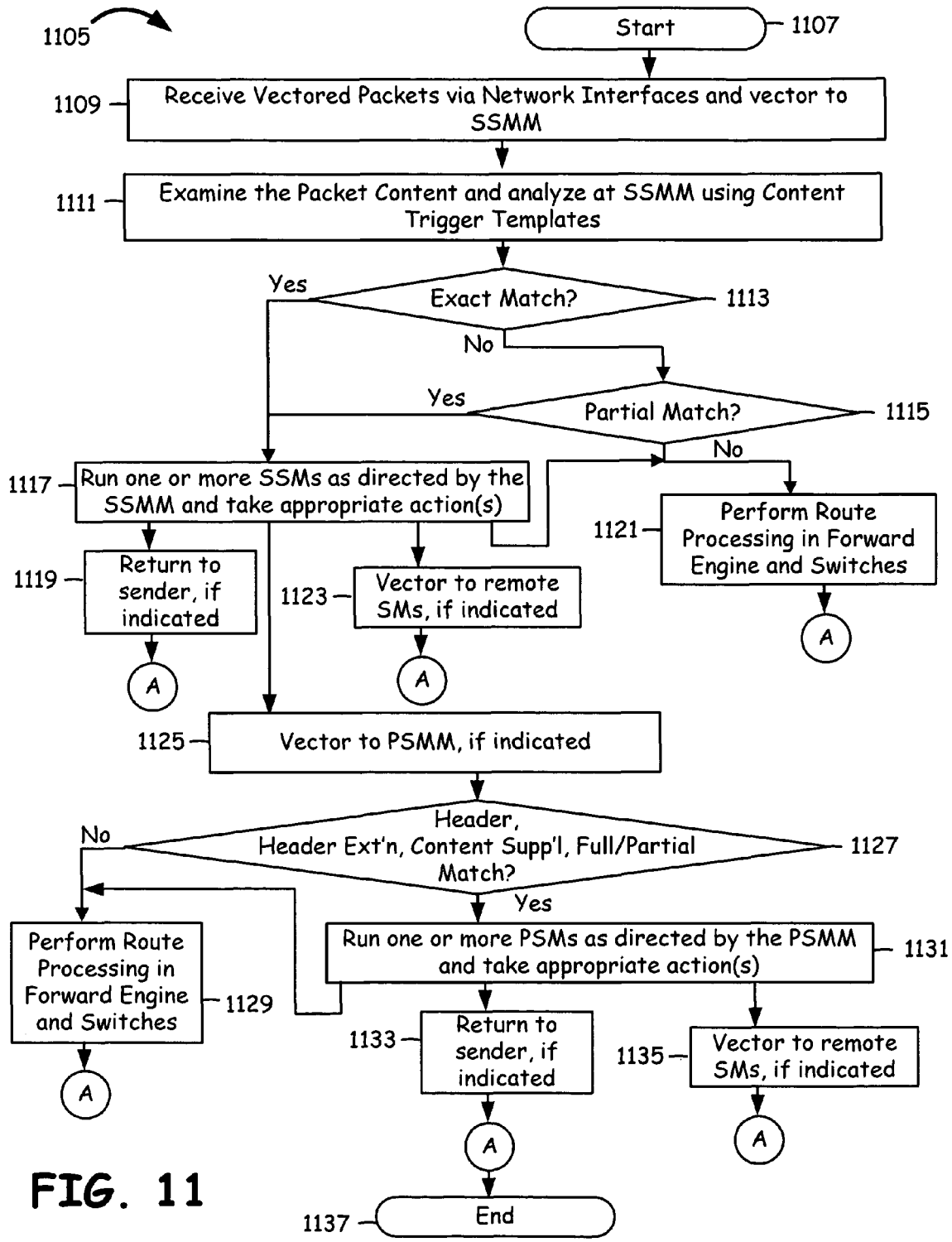
FIG. 11 is a flowchart illustrating detailed flow of functionality of service module managers (SSMM and PSMM) of FIGS. 3 and 5.

FIG. 11 is a flowchart 1105 illustrating detailed flow of functionality of service module managers (SSMM and PSMM) of FIGS. 3 and 5. The method described here refers to a particular embodiment; it may differ when considering other embodiments. The method begins at start block 1107. At a next block 1109, the secondary processing circuitry receives vectored packets via network interfaces and vectors the packet to the SSMM. At next block 1111, the secondary processing circuitry examines the packet and executes SSMM using content trigger templates. That is, a comparison is made between the various fields of the packet with that of the content trigger templates at the SSMM. The content trigger templates may be simple by itself in the SSMM when compared to the PSMM and trigger logic may or may not exist at the SSMM.

Then at a next decision block 1113, whether there is any exact match in the comparison. Then at another decision block 1115, if there is any partial match, in the comparison, is verified. At a next block 1117, if there is partial or exact match at blocks 1113 and 1115, the secondary processing circuitry executes one or more secondary service modules (SSMs) as indicated in the trigger logic of the SSMM and takes appropriate actions as directed by the SSMs. If there is no trigger logic in the SSMM, the packets may be vectored to the PSMM for further analysis. Further, in the block 1117, the SSM processing for exact match and partial match may be different in certain cases. If there is neither exact match nor partial match at the decision blocks 1113 and 1115, then at a next block 1121, the secondary processing circuitry performs route processing using the forwarding engine, switches, and forwards the packet to the next node. The method ends at a next end block at 1137.

At block 1119, one of the actions taken is to return to the sender, if indicated in the SSM. Then, the process ends in the end block at 1137. At block 1123, another of the actions taken is to make a copy or vector the packet without making a copy to a remote network device, for application of remote SM processing. The packet may be forwarded from the remote network device directly to the destination or may be vectored back to the device in consideration for further processing. Then the method ends at the next block 1137. Once appropriate SSM processing is done in the block 1117, another of the actions taken by the secondary processing circuitry is to perform route processing using the forwarding engine, switches, and forwards the packet to the next node, at the block 1121. Then, the method ends at the end block at 1137. One of the actions that might be taken, at a next block 1125, is to vector the packet to PSMM, if indicated.

Then, at a next decision block 1127, the primary processing circuitry verifies if there are any partial of full match with header, extension header and/or content supplemental trigger templates. If no full or partial matches, at a next block 1129, the primary processing circuitry performs route processing using the forwarding engine, switches, and forwards the packet to the next node. The method ends at the end block at 1137. At a next block 1131, if there is partial or full match at the block 1127, the primary processing circuitry executes one or more primary service modules (PSMs) as indicated in the trigger logic of the PSMM and takes appropriate actions as directed by the PSMs or the trigger logic.

At block 1133, one of the actions taken is to return to the sender, if indicated in the PSM. Then, the process ends in the end block at 1137. At block 1135, another of the actions taken is to make a copy or vector the packet without making a copy to a remote network device, for application of remote SM processing. Again, the packet may be forwarded from the remote network device directly to the destination or may be vectored back to the device in consideration for further processing. Then the method ends at the next block 1137. Once appropriate PSM processing is done in the block 1131, another of the actions taken by the primary processing circuitry is to perform route processing using the forwarding engine, switches, and forwards the packet to the next node, at the block 1129. Then, the method ends at the end block at 1137.

As one of average skill in the art will appreciate, the term "communicatively coupled", as may be used herein, includes wireless and wired, direct coupling and indirect coupling via another component, element, circuit, or module. As one of average skill in the art will also appreciate, inferred coupling (i.e., where one element is coupled to another element by inference) includes wireless and wired, direct and indirect coupling between two elements in the same manner as "communicatively coupled".

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A packet switching exchange that receives a plurality of packets, each of the plurality of packets having header content and payload content, the packet switching exchange comprising:
   a plurality of switches;
   primary processing circuitry communicatively coupled to the plurality of switches;
   one or more line cards, communicatively coupled to the plurality of switches, each of the one or more line cards comprising a network interface and processing circuitry configured to compare the header content of a received packet with a trigger template to determine if the received packet is to be delivered to the primary processing circuitry, and based on a result of the comparison of the header content, deliver the received packet to the primary processing circuitry along with a request for the primary processing circuitry to perform a comparison using a supplemental template;
   the primary processing circuitry configured to compare the payload content of a received packet with the supplemental template to determine if the received packet is to be delivered to a service module, and, based on a result of the comparison of the payload content, deliver the received packet to the service module for processing; and
   the processing circuitry further configured to deliver supplemental information to the primary processing circuitry based on a result of the comparison of the header content, the supplemental information identifying the service module to which the received packet is to be delivered, and a service to be provided.

2. The packet switching exchange of claim 1, wherein the packet switching exchange is a router.

3. The packet switching exchange of claim 1, wherein the packet switching exchange is an access point.

4. The packet switching exchange of claim 1, further comprising the service module.

5. The packet switching exchange of claim 1, wherein the service module is a remote service module.

6. A network node in a packet switched network that participates in a communication pathway between a first end-point device and a second endpoint device, the communication pathway supporting delivery of a packet, the network node comprising:
   first communication interface circuitry communicatively coupled to the first end-point device via a first portion of the communication pathway;
   second communication interface circuitry communicatively coupled to the second endpoint device via a second portion of the communication pathway;
   processing circuitry communicatively coupled to both the first communication interface circuitry and the second communication interface circuitry;
   storage, communicatively coupled to the processing circuitry, comprising a plurality of templates;
   the processing circuitry to compare the packet to the plurality of templates, and based on the comparison, both selectively vector the packet out of the communication pathway to at least one of a plurality of service modules for application of service, and deliver a copy of the packet into the communication pathway; and
   the processing circuitry further to deliver a request to the at least one of the plurality of service modules to apply a specific type of processing to the packet selectively vectored out of the communication pathway.

7. The network node of claim 6, wherein the selective vectoring of the packet out of the communication pathway comprises applying local service functionality to the packet.

8. The network node of claim 6, wherein the selective vectoring of the packet out of the communication pathway comprises delivering the packet to a remote server.

9. The network node of claim 6, wherein the network node comprising an access point.

10. The network node of claim 6, wherein the plurality of templates comprising a payload template.

11. The network node of claim 6, wherein the processing circuitry executes trigger logic to determine whether to vector the packet out of the communication pathway.

12. The network node of claim 6, wherein the plurality of service modules comprising a local service module.

13. The network node of claim 6, wherein the plurality of service modules comprising a remote service module.

14. A packet switching infrastructure that communicates a plurality of packets, each of the plurality of packets having payload content, the packet switching infrastructure comprising:
   a packet switched pathway that communicates the plurality of packets;
   a plurality of service functions;
   a plurality of predefined templates comprising at least one header template and at least one payload template;
   processing circuitry that delivers the plurality of packets along at least a portion of the packet switched pathway;
   the processing circuitry configured to perform an initial comparison of at least one of the plurality of packets with the at least one header template to determine whether additional processing is to be performed on the at least one of the plurality of packets;
   the processing circuitry further configured to perform a second comparison of the at least one of the plurality of packets with the at least one payload template to determine a selected function of the plurality of service functions is to be performed on the at least one of the plurality of packets; and
   the processing circuitry, based at least in part on the second comparison, selects one of a plurality of service modules to perform the selected function on the at least one of the plurality of packets.

15. The packet switching infrastructure of claim 14, wherein the processing circuitry comprising switching node circuitry.

16. The packet switching infrastructure of claim 14, wherein the processing circuitry comprising end point device circuitry.

17. The packet switching infrastructure of claim 14, wherein the processing circuitry comprising access point circuitry.

18. The packet switching infrastructure of claim 14, wherein the plurality of service functions comprising a service function at a different premises than that of the processing circuitry.

19. The packet switching infrastructure of claim 14, wherein the plurality of service functions comprising a service function performed by the processing circuitry.

20. The packet switching infrastructure of claim 14, wherein the plurality of service functions comprising a service function performed by remote processing circuitry.

21. A method performed by a network node in a packet switched communication pathway, the packet switched communication pathway for routing a plurality of packets, the method comprising:

performing a first comparison comparing at least a first one of the plurality of packets against at least a first one of a plurality of predefined templates;

performing a second comparison comparing the at least a first one of the plurality of packets against at least a second one of the plurality of predefined templates;

encapsulating the at least a first one of the plurality of packets in a request to a service module to apply a specific type of processing to the packet;

routing the request encapsulating the at least a first one of the plurality of packets to a remote service function outside the communication pathway in response to the second comparison; and routing of the at least a first of the plurality of packets into the communication pathway.

22. The packet switching exchange of claim 1, wherein the primary processing circuitry is further configured to vector the received packet out of a communications pathway for processing by the service module.

23. The packet switching infrastructure of claim 14, wherein the processing circuitry is configured to vector the at least one of the plurality of packets out of a communication pathway for application of the selected one of the plurality of service functions.

* * * * *